(12) United States Patent
Skarby

(10) Patent No.: US 8,995,097 B2
(45) Date of Patent: Mar. 31, 2015

(54) HIGH VOLTAGE DC BREAKER APPARATUS

(75) Inventor: Per Skarby, Wuerenlos (CH)

(73) Assignee: ABB Technology AG, Zurich (CH)

( * ) Notice: Subject to any disclaimer, the term of this patent is extended or adjusted under 35 U.S.C. 154(b) by 345 days.

(21) Appl. No.: 13/697,204

(22) PCT Filed: May 9, 2011

(86) PCT No.: PCT/EP2011/057433
§ 371 (c)(1),
(2), (4) Date: Nov. 30, 2012

(87) PCT Pub. No.: WO2011/141428
PCT Pub. Date: Nov. 17, 2011

(65) Prior Publication Data
US 2013/0070492 A1    Mar. 21, 2013

(30) Foreign Application Priority Data
May 11, 2010   (WO) ................ PCT/EP2010/056474

(51) Int. Cl.
*H02H 3/087*   (2006.01)
*H01H 33/59*   (2006.01)
*H02H 3/00*   (2006.01)
*H01H 9/54*   (2006.01)

(52) U.S. Cl.
CPC ............ *H02H 3/087* (2013.01); *H01H 33/596* (2013.01); *H02H 3/00* (2013.01); *H01H 9/548* (2013.01)
USPC ........................................................ 361/2

(58) Field of Classification Search
USPC ........................................................ 361/2
See application file for complete search history.

(56) References Cited

U.S. PATENT DOCUMENTS

| | | | | |
|---|---|---|---|---|
| 4,171,532 A | * | 10/1979 | Sloan et al. | 361/13 |
| 4,216,513 A | * | 8/1980 | Tokuyama et al. | 361/13 |
| 4,420,784 A | * | 12/1983 | Chen et al. | 361/7 |
| 5,452,170 A | * | 9/1995 | Ohde et al. | 361/13 |
| 5,517,378 A | | 5/1996 | Asplund et al. | |
| 6,104,583 A | * | 8/2000 | Wynn et al. | 361/7 |
| 6,166,456 A | * | 12/2000 | Gruning | 307/64 |
| 8,717,716 B2 | * | 5/2014 | Hafner et al. | 361/8 |
| 2013/0038975 A1 | * | 2/2013 | Hafner et al. | 361/93.9 |

FOREIGN PATENT DOCUMENTS

| | | |
|---|---|---|
| DE | 4304863 A1 | 8/1993 |
| EP | 0740320 A2 | 10/1996 |
| WO | WO 2009/149749 A1 | 12/2009 |

* cited by examiner

*Primary Examiner* — Ronald W Leja
(74) *Attorney, Agent, or Firm* — Birch, Stewart, Kolasch & Birch, LLP

(57) ABSTRACT

A high voltage DC breaker apparatus configured to interrupt a fault current occurring in a high voltage DC conductor comprises a mechanical interrupter, at least one semiconductor device connected in series with the interrupter, an arrester connected in parallel with the semiconductor device and an LC-circuit connected in parallel with the series connection of the semiconductor device and the interrupter. A control unit is configured to, upon detection of a fault current, control switching of the semiconductor device at a frequency adapted to the values of an inductance and a capacitance of the LC-circuit for charging the capacitance by the fault current while making the current through the interrupter oscillating with an increasing amplitude and the interrupter to open for having the mechanical contacts thereof separated when current zero-crossing is reached for obtaining interruption of the fault current through the interrupter.

20 Claims, 4 Drawing Sheets

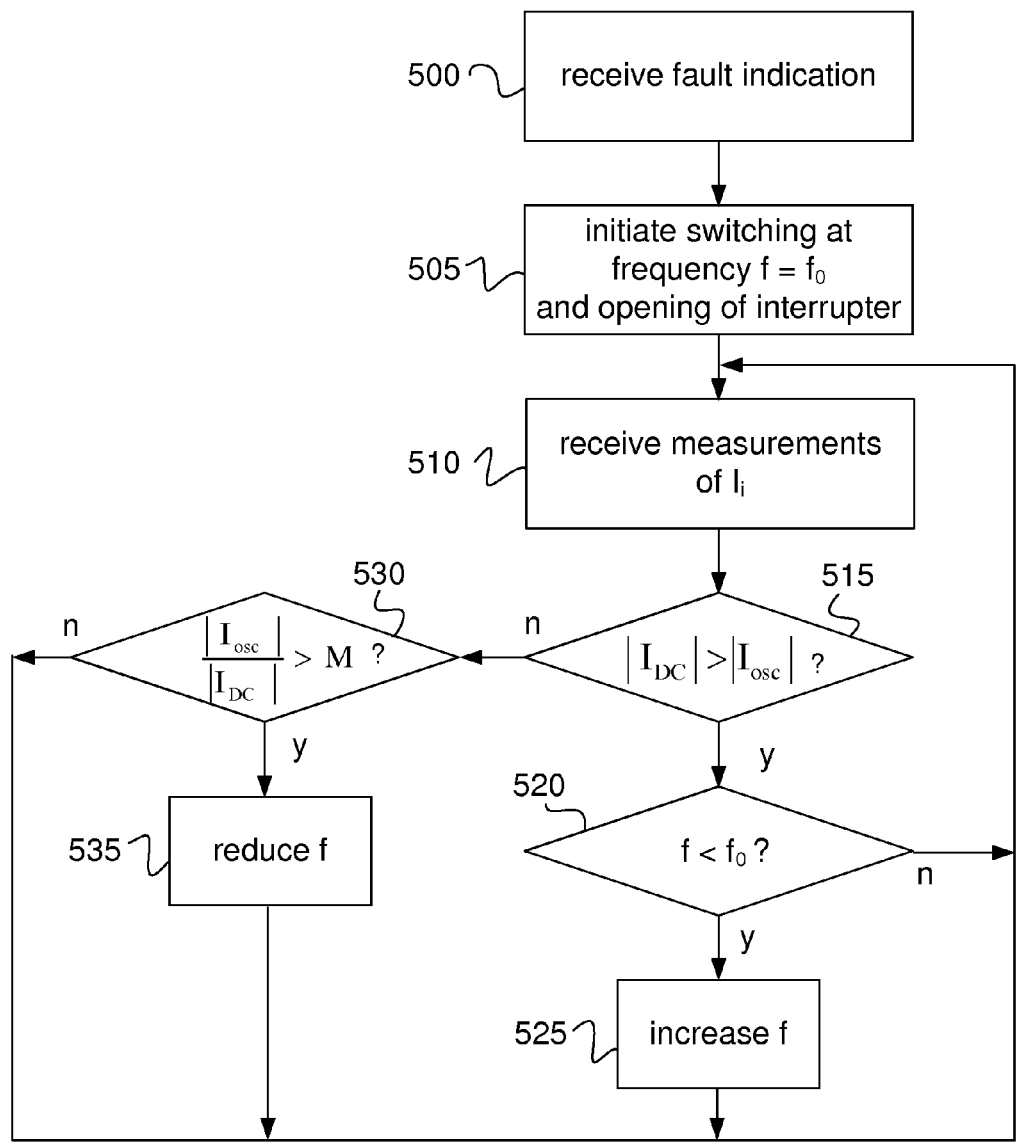

HIGH VOLTAGE DC BREAKER APPARATUS

TECHNICAL FIELD

The present invention relates to a DC breaker apparatus configured to interrupt a fault current occurring in a high voltage DC conductor.

BACKGROUND

A high voltage DC breaker apparatus may be arranged in a high DC voltage carrying system, for example in Voltage Source Converter based multi-terminal HVDC (High Voltage Direct Current) networks where fast-rising DC fault currents must be interrupted quickly at high voltages. Such faults may be line-to-line faults or line-to-ground faults, i.e. short-circuits of the DC conductor to earth. By high voltage is here meant a voltage 10 kV (and often a voltage of several hundreds of kV) with respect to ground.

In one type of known such breaker apparatuses said arrangement configured to obtain zero-crossing of a fault current through the interrupter comprises a passive LC-circuit generating an oscillation of fault current through the interrupter with the aim to obtaining a zero-crossing of the fault current. A disadvantage of using such an arrangement is the uncertainty as to when zero-crossing of the current will actually occur, which results in a risk of failing the arc extinguishing window when interruption of the current is possible, so that interruption of the fault current may not be reliably ensured.

Another type of known high voltage DC breaker apparatuses uses a said arrangement having a pre-charged capacitor connected in parallel with the mechanical interrupter for obtaining current-zero-crossing of the fault current. However, this solution is comparatively costly, since a large capacitor as well as a separate high voltage charging device for charging the capacitor are needed.

U.S. Pat. No. 5,517,378 discloses a high voltage DC breaker which has two mechanical breakers adapted to be traversed by the line current and to be opened for breaking the current. A capacitor is connected in parallel with the series connection of the breakers. A semiconductor member is connected in parallel with a first one of the breakers. Upon opening of the breakers, a control member controls the semiconductor member such that a zero crossing of the current through the second breaker is obtained, whereby the line current is commutated over to the capacitor.

SUMMARY

The object of the present invention is to provide a DC breaker apparatus which can provide a reliable breaking of a high DC current at a higher speed.

This object is obtained by providing a DC breaker apparatus configured to interrupt a fault current occurring in a high voltage DC conductor. Said apparatus comprises:
  at least one mechanical interrupter configured to be connected in series with said DC conductor,
  an arrangement configured to obtain zero-crossing of the current through said interrupter upon occurrence of a fault current in said conductor, and
  a control unit configured to control said arrangement and mechanical interrupter, The arrangement configured to interrupt a fault current comprises:
  at least one semiconductor device of turn-off type connected in series with said mechanical interrupter,
  an arrester connected in parallel with said semiconductor device for defining a maximum voltage across said device, and
  an LC-circuit in the form of a series connection of an inductance and a capacitance connected in parallel with the series connection of said semiconductor device and the mechanical interrupter.

The DC breaker apparatus comprises a control unit configured to control the mechanical interrupter and the arrangement for obtaining current-zero-crossing, where the control unit is configured to, upon detection of a fault current,
  control the switching control switching of at least one of said at least one semiconductor devices at a frequency adapted to the values of said inductance and capacitance, in order to charge said capacitance by the fault current while making the current through the mechanical interrupter (2) oscillate with an increasing amplitude, and
  control the tripping of the mechanical interrupter so that the mechanical contacts thereof will be separated when a current zero-crossing is reached, so that interruption of the fault current through the mechanical interrupter is obtained.

Compared to the DC breaker of U.S. Pat. No. 5,517,378, the inventive DC breaker apparatus can be faster, since no commutation of the current into the semiconductor device used for switching is necessary.

By using the fault current to charge the capacitance, no high voltage charging device is needed, but a well defined zero-crossing of the fault current will still be obtained by an appropriate control of said switching of the semiconductor device. Furthermore, only a small capacitance will be needed for obtaining said zero-crossing of the fault current.

Thanks to the fact that said semiconductor device only needs to be rated for a voltage in the order of the protective voltage level of said arrester, which may be only a small fraction of the system voltage, i.e. the voltage of a said high voltage DC conductor with respect to ground, investment costs will be low. The on-state losses in said semiconductor device will also be low under normal operation of the high voltage DC system in question.

Another advantage of an apparatus according to the invention is that a gradually growing current oscillation through the interrupter prevents current zero over-shoot and results in a feasible switching duty for the mechanical interrupter, i.e. a low enough current and voltage time derivative. The protective voltage level of said arrester and the values of said inductance and capacitance of the LC-circuit may be selected for obtaining secure interruption by the mechanical interrupter within an acceptable period of time after occurrence of a said fault. Accordingly, the generation of current zero-crossings for obtaining interruption of the fault current is dealt with by the semiconductor device, whereas interrupting of the fault current is taken care of by the mechanical interrupter. This combines the benefits of the semiconductor device of fast switching and well-defined blocking voltage with the advantages of a mechanical interrupter relating to high dielectric withstand capability and low losses.

The arrangement configured to obtain zero crossing can advantageously comprise a rectifying element connected in anti-parallel with a said at least one semiconductor device. In one implementation, the rectifying element is a diode. In order to obtain a bi-directional DC current breaker, the arrangement could include a series connection of two semiconductor devices of opposite conducting directions, where each of the semiconductor devices are connected in parallel with a diode of opposite conducting direction to that of the semiconductor device. In this configuration, the two diodes (which are anti-parallel) are connected in series. In an alternative implementation of the arrangement to obtain zero crossing, a rectifying element in the form of an additional semiconductor device is provided, so that two semiconductor devices are connected in anti-parallel, thus facilitating for bi-directional breaking possibilities.

According to an embodiment of the invention the control unit is configured to carry out said switching of the semiconductor device at a frequency being 90%-110% of the eigenfrequency of said LC-circuit. A switching frequency close to the eigenfrequency of the LC-circuit can result in a desired oscillation of the fault current through the interrupter and reaching of zero-crossing of the fault current when the current derivative is zero or close to zero, so that it will be favourable to then interrupt the current.

According to one embodiment, the switching frequency is fixed and set in accordance with the eigenfrequency of the LC circuit. According to another embodiment of the invention the apparatus further comprises at least one measuring device configured to measure at least one parameter relating to the operation of said arrangement upon occurrence of a said fault and send the result of this measurement to said control unit configured to adapt said switching of this measurement result. Such a feedback for the switching of the semiconductor device results in a possibility to control how and when zero-crossing of the fault current will appear for obtaining reliable interruption of the fault current. Suitable parameters to measure may be the current through said semiconductor device and/or the voltage across said capacitance, which constitutes further embodiments of the invention.

According to an embodiment of the invention said control unit is configured to delay initiation of separation of the mechanical contacts of the interrupter by a determined period of time with respect to the start of the switching of said semiconductor device for possibly refraining from opening the interrupter should said control unit receive information about a disappearance of said fault within this period of time. It has turned out that it is well possible to obtain interruption even if such a delay is used, which may then result in avoidance of unnecessary interruption in the case of a quick disappearance of the fault condition.

According to an embodiment of the invention the apparatus comprises a further arrester connected in parallel with said LC-circuit. This further arrester will limit the rising recovery voltage across the mechanical interrupter after interruption of the fault current.

According to an embodiment of the invention the protective voltage level of said arrester connected in parallel with the LC-circuit is at least 120% or 130%-200% of the DC voltage intended for a said DC conductor with respect to ground. A protective voltage level of about 150% of the system voltage is normally suitable for an arrester in parallel with such a mechanical interrupter.

According to an embodiment of the invention the apparatus comprises a current derivative limiting reactor configured to be connected in series with said parallel connection of the LC-circuit and the series connection of the semiconductor device and the mechanical interrupter in said DC conductor. Such a reactor will limit the rise of the fault current.

According to an embodiment of the invention said control unit is configured to carry out said switching of the semiconductor device with a frequency of 100 Hz-10 kHz or 500 Hz-5 kHz. Such switching frequencies are suitable for the operation of a switching device in an apparatus of this type, in which the inductance may typically have a value of 0.1 mH-10 mH and the capacitance a value of 10 nF-100 μF or 0.5 μF-5 μF.

According to an embodiment of the invention the apparatus is configured to interrupt a fault current occurring in a high voltage DC conductor intended to be at a voltage level of ≥10 kV with respect to ground, for example at a voltage level within one of the following ranges: 10 kV-1000 kV, 100 kV-1000 kV or 300 kV-1000 kV with respect to ground, or higher.

According to an embodiment of the invention the protective level of said arrester connected in parallel with said semiconductor device is less than 50% or less than 10% of the voltage level intended for said high voltage DC conductor with respect to ground. It may be mentioned that said protective voltage level may for instance be about 10 kV at the same time as the voltage level intended for said high voltage DC conductor with respect to ground may be 400 kV.

According to an embodiment of the invention the apparatus is configured to be connected to a said high voltage DC conductor in an AC/DC converter station, and according to another embodiment the apparatus is configured to be arranged in a DC grid for protecting equipment connected therein.

The invention also relates to a plant for transmitting electric power through High Voltage Direct Current, which is characterized in that it is provided with a DC breaker apparatus according to the invention. Such a plant may benefit from the positive features mentioned above of such an apparatus.

The invention also relates to a method for controlling a high voltage DC breaker apparatus according to the invention so as to interrupt a fault current detected in said high voltage DC conductor as well as a computer program product and a computer readable medium associated with such a method.

Further advantages as well as advantageous features of the invention will appear from the following description.

BRIEF DESCRIPTION OF THE DRAWING

With reference to the appended drawing, below follows a specific description of an embodiment of the invention cited as examples.

In the drawing:

FIG. 5 is a flowchart schematically illustrating an embodiment of a method performed by a control unit for controlling the operation of a DC breaker apparatus comprising an arrangement for obtaining current-zero-crossing.

DETAILED DESCRIPTION OF AN EMBODIMENT OF THE INVENTION

Figure 1:
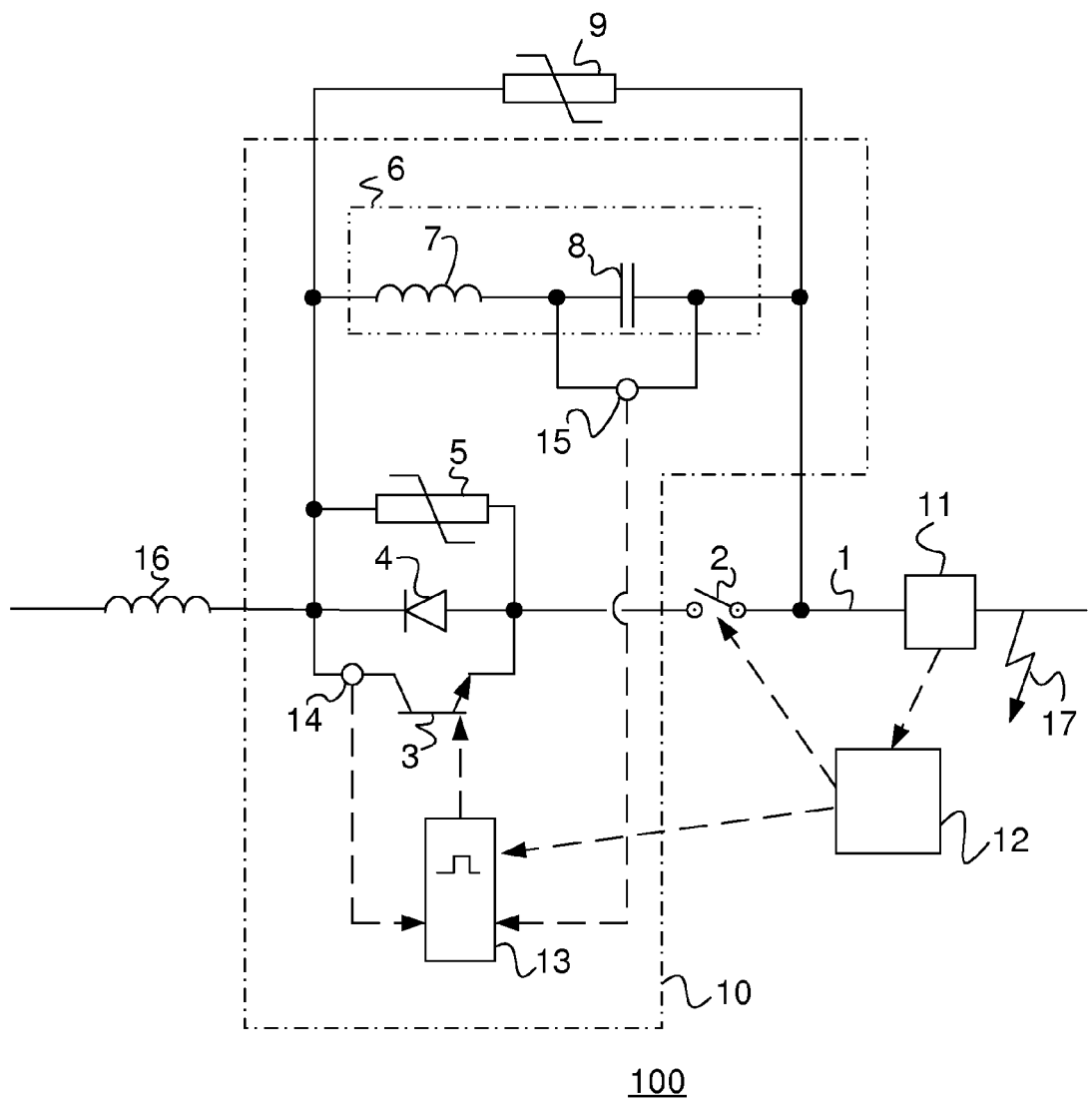
FIG. 1 is a schematic view of a high voltage DC breaker apparatus according to an embodiment of the invention, FIG. 2*a-c* schematically illustrate different embodiments of an arrangement for obtaining current-zero-crossing

FIG. 1 shows schematically a high voltage DC breaker apparatus 100 according to an embodiment of the present invention. This DC breaker apparatus 100 is configured to interrupt a fault current occurring in a high voltage DC conductor 1 and comprises a mechanical interrupter 2 which may stand for one or several mechanical interrupters, e.g. an SF6- or vacuum-interrupter or a combination thereof, and connected in series therewith a semiconductor device 3 of turn-off type (i.e. a device which can be controlled to switch off, as well as to switch on). In the embodiment of FIG. 1, the semiconductor device 3 is an IGBT which is configured to conduct in the direction towards the interrupter. A rectifying diode 4 is connected in anti-parallel with the semiconductor device 3, so that the conducting direction of the rectifying diode is opposite to the conducting direction of the semiconductor device. An arrester 5 is connected in parallel with the semiconductor device for defining a maximum voltage across this semiconductor device by having a suitable protective voltage level. In one implementation, the protective voltage level is 10 kV. However, other values can be used, and in particular, the range of suitable levels will vary with the voltage rating of the breaker apparatus.

Semiconductor device 3 of FIG. 1 is an IGBT (Insulated Gate Bipolar Transistor) device. Other types of semiconductor devices of turn-off type could alternatively be used in semiconductor device 3, such as GTO:s (Gate Turn-Off thyristors) and IGCT:s (Insulated Gate Commutated Thyristors). Semiconductor device 3 could be implemented as a single semiconductor element, or as a series and/or parallel connection of more than one semiconductor element.

The blocking voltage capability of the semiconductor device 3 shall be higher than this protective voltage level. Accordingly, the arrester 5 ensures that the voltage across the semiconductor device will never reach the level of the voltage blocking capability of the semiconductor device when this is turned off.

Furthermore, an LC-circuit 6 in the form of a series connection of an inductance 7 and a capacitance 8 is connected in parallel with the series connection of the semiconductor device 3 and the mechanical interrupter 2. A further arrester 9 is connected in parallel with the LC-circuit 6, and this arrester has a protective voltage level exceeding the level of the DC voltage intended for said DC-conductor 1 with respect to ground and is for example 150% of that voltage level.

The DC breaker apparatus 100 also comprises an arrangement 10 configured to obtain zero-crossing of a fault current through the interrupter 2 upon occurrence of a fault in the DC conductor 1 or in equipment connected to the DC conductor, and this arrangement will partly be formed by components of the apparatus already described. In the following, this arrangement will be referred to as an arrangement 10 for obtaining current-zero-crossing. A current-zero-crossing is an instance in time where the current through the mechanical interrupter 2 is reversed. Arrangement 10 of FIG. 1 is shown to include the parallel connection of the semiconductor device 3, the rectifying diode 4 and the arrester 5, as well as the a pulse generator 13 connected to the control terminal of the semiconductor device 3, and arranged to generate a pulse signal for turning on and turning off the semiconductor device 3. The control terminal of an IGBT is typically the gate terminal, while the control terminal of other types of semiconductor devices could e.g. be the gate or the base terminal. The arrangement 10 for obtaining current-zero-crossing further includes the LC circuit 6.

Arrangement 10 of FIG. 1 is further shown to include a current measurement device arranged to measure the current through the semiconductor device 3 and a voltage measurement device 15 arranged to measure the voltage across the capacitor 8.

The output of current measurement device 14 and the voltage measurement device 15 of FIG. 1 are connected to the pulse generator 13, possibly via a control unit 12, so that the frequency of the pulses generated by pulse generator 13 and provided to the control terminal of the semiconductor device 3 can, in one embodiment, be adjusted in dependence on the current through the semiconductor device 3 and the voltage across the capacitor 8. Such adjustment of the switching frequency will be further described in relation to FIG. 5.

The current measurement device 14 could for example be an optical current transducer (OCT) or a DC current feedback compensation transducer (DCCT), or any other suitable current transducer, sensor or other current measurement means. The voltage measurement devices 15 could for example be direct voltage divider, or any other suitable voltage measurement means.

DC breaker apparatus 100 of FIG. 1 further comprises means arranged and configured to detect occurrence of a fault current in said DC conductor 1, said means shown in FIG. 1 as fault-current detector 11. Fault-current detector 11 could for example include an optical current transducer (OCT) or a DC current feedback compensation transducer (DCCT), or any other suitable current transducer, sensor or means for detecting a fault current. Fault-current detector 11 could for example further include hardware or software for comparing a measurement (or a set of measurements) from the current transducer with a current and/or current derivative threshold, in order to detect a fault which causes, or is at risk to cause, the current through the DC breaker apparatus 100 to increase beyond an acceptable level. Fault-current detector 11 could furthermore be arranged to generate a signal in response to detection of a fault current. The output at which such signal will be generated can advantageously be connected to an input of a control unit 12.

The DC breaker apparatus 100 of FIG. 1 comprises a control unit 12 configured to control the arrangement 10 for obtaining current-zero-crossing as well as for controlling the mechanical interrupter 2. The control unit 12 is configured to control switching of the semiconductor device 3, in case a fault has been detected, by sending control signals to the pulse generator 13. The switching induced by the pulse generator 13 is then carried out at a frequency adapted to the values of the inductance 7 and capacitance 8 for charging said capacitance by the fault current as will be described more in detail further below. In FIG. 1, it is illustrated that the DC breaker apparatus 100 may also have measuring means, said measuring means shown in FIG. 1 as current measurement device 14 for measuring the current through the semiconductor device 3 and voltage measuring device 15 for measuring the voltage across the capacitance 8, as discussed above. Voltage and current measurement devices 14, 15 of FIG. 1 are configured to send measurement results to the control unit 12 (pulse generator 13), which may then consider these results when controlling the switching of the semiconductor device 3. In FIG. 1, pulse generator 13 has, for illustrative purposes, been illustrated as a separate unit to control unit 12. However, pulse generator 13 is often seen as part of the control unit 12.

The DC breaker apparatus 100 of FIG. 1 also includes a current derivative limiting reactor 16 connected in series with the parallel connection of the LC-circuit 6 and the series connection of the semiconductor device 3 and the mechanical interrupter 2 in said DC conductor 1. In FIG. 1, the current derivative limiting reactor 16 is connected upstream this parallel connection as seen in the conducting direction of the semiconductor device. However, the reactor 16 could alternatively be connected downstream this parallel connection. A current limiting device in the form of at least one module of a parallel connection of a semiconductor device of turn-off type, such as an IGBT, and an arrester may be connected in series with the reactor 16 and assist this in limiting a fault current or even replace the reactor.

Possible values of components of the DC breaker apparatus 100 of FIG. 1 may be as follows: the reactor 16 has an inductance of 100 mH and the inductance 7 an inductance of 0.6 mH. The capacitance 8 is 1 µF. The DC conductor 1 is at a voltage of 320 kV with respect to ground and the protective level of the arrester 5 is 10 kV. These values are given as examples only, and other values of the components could be used for a 320 kV DC breaker apparatus, Furthermore, the suitable value ranges depend on the voltage rating of the DC breaker apparatus 100, and when designing a DC breaker apparatus of a different voltage rating, the values of the components could advantageously be adjusted accordingly.

It is pointed out that the DC breaker apparatus 100 as shown in FIG. 1 is configured to interrupt a fault current upon occurrence of a fault 17 on the right side of the interrupter as seen in the drawing, but it is of course within the scope of the invention to modify the DC breaker apparatus 100 so as to instead be able to take care of a fault occurring on the left side of the interrupter and also so as to be able to take care of faults occurring on both sides of the DC breaker apparatus 100, which for example may be obtained by connecting a further parallel connection of an arrester and a semiconductor device of turn-off type in series with the parallel connection shown in FIG. 1 and with that semi-conductor device having opposite conducting direction. Examples of such alternative embodiments of the arrangement 10 will be further described in relation to FIGS. 2a-c. In order to simplify the drawings, the LC circuit 6 of arrangement 10 has been left out in FIGS. 2a-c. Another option would be to have a breaker configuration in an adjacent switch gear preventing current in more than one direction.

Figure 2A:
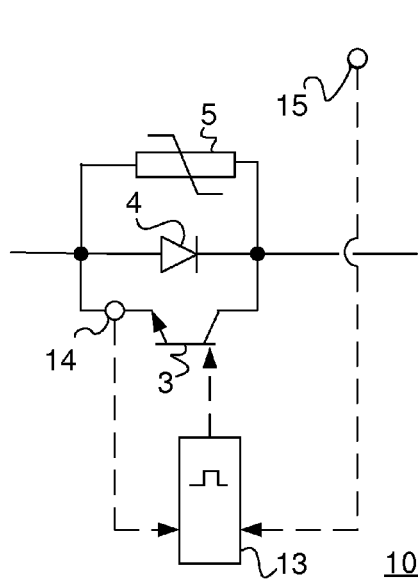

FIG. 2a shows an embodiment of the arrangement 10 for obtaining current-zero-crossing, wherein the arrangement 10 comprises a parallel connection of a semiconductor device 3 of turn-off type, a rectifying diode 4 and an arrester 5. The arrangement 10 of FIG. 2a differs from the arrangement 10 of FIG. 1 in that the semiconductor device 3 and the rectifying diode 4 of FIG. 2a are arranged to conduct in the opposite direction to that of the corresponding components of FIG. 1. The arrangement 10 of FIGS. 1 and 2a are capable of inducing an oscillation giving rise to a current-zero-crossing for DC currents flowing in the conducting direction of the semiconductor device 3. Hence, an arrangement 10 of FIG. 1 or FIG. 2a can be useful in applications where a DC current will only flow in one direction, e.g. in a mono-directional DC breaker apparatus 100, or at least, where the capability of breaking a DC current will only be required in relation to DC currents of a single direction. The arrangements 10 of FIG. 1 and FIG. 2a could be connected either so that the semiconductor device 3 will be conducting in the direction towards the mechanical interrupter 2, or so that the semiconductor device 3 will be conducting in the direction away from the mechanical interrupter 2 along the series connection of the semiconductor device 3 and the mechanical interrupter 2.

Figure 2B:
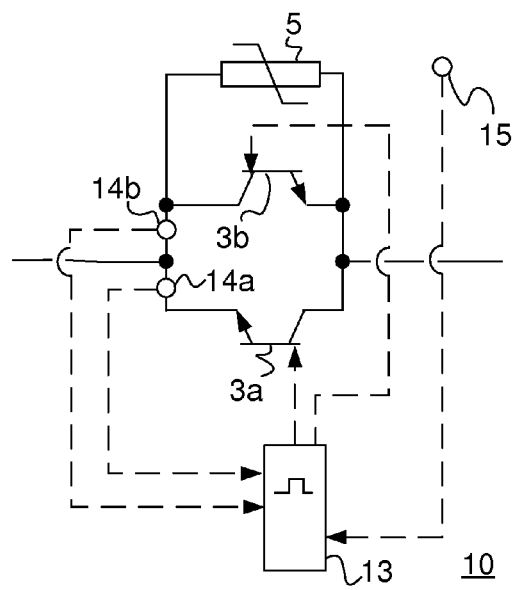
Figure 2C:
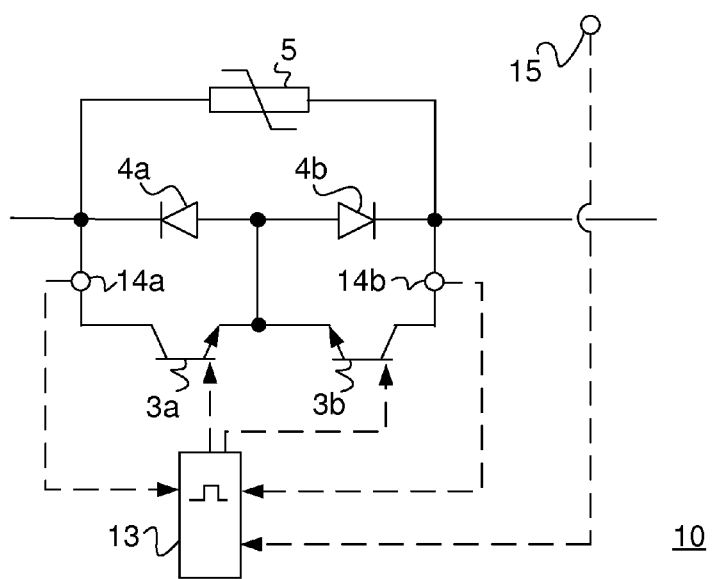

FIGS. 2b and 2c each show an embodiment of the arrangement 10 wherein the arrangement 10 is capable of inducing an oscillation giving rise to a current-zero-crossing for DC currents flowing in both directions of the DC conductor 1. Hence, the embodiments of arrangement 10 shown in FIGS. 2b and 2c could advantageously be used in a bidirectional DC breaker apparatus 100.

The arrangement 10 of FIG. 2b comprises a parallel connection of a first semiconductor device 3a of turn-off type and a second semiconductor device 3b of turn-off type, where the first and second semiconductor devices 3a and 3b are capable of conducting current in opposite directions, the semiconductor devices 3a and 3b thus being connected in anti-parallel. The parallel connection of the two semiconductor devices is connected in parallel with an arrester 5. When an excessive current has been detected by fault-current detector 11 in a first current direction, the semiconductor device which is capable of conducting in this first direction will be switched on and off in order to introduce an oscillation (the semiconductor device of the opposite current direction could in the meantime be switched on and off at the same frequency, or could be turned on or off as desired). A first current measurement device 14a is arranged to measure the current in the first semiconductor device 3a, while a second current measurement device 14b is arranged to measure the current in the second semiconductor device 3b. Current measurement devices 14a and 14b are connected to an input of pulse generator 13, in order to allow for adjustment of the switching in dependence on the current through the superconductor devices.

The arrangement 10 of FIG. 2c comprises two semiconductor devices 3a and 3b which are connected in series, and which are arranged to conduct current in opposite directions. Each semiconductor device 3a, 3b has a rectifying diode 4a, 4b, respectively, connected in anti-parallel. Furthermore, an arrester 5 is connected in parallel with the series connection of semi-conductor devices 3a, 3b. When an excessive current has been detected by fault-current detector 11 in a first current direction, the semiconductor device which is capable of conducting in this first direction will be switched on and off in order to introduce an oscillation (the semiconductor device of the opposite current direction could in the meantime be switched on and off at the same frequency, or could be turned on or off as desired). As in the arrangement 10 of FIG. 2b, a first current measurement device 14a is arranged to measure the current in the first semiconductor device 3a, while a second current measurement device 14b is arranged to measure the current in the second semiconductor device 3b. Current measurement devices 14a and 14b are connected to an input of pulse generator 13, in order to allow for adjustment of the switching in dependence on the current through the superconductor devices.

In the following, the term forward-conducting semiconductor device 3 will be used to refer to a semiconductor device which is capable of conducting current in the direction of a DC current to be broken and which therefore can be used for obtaining an oscillating current through the mechanical interrupter 2, in order to simplify the description in relation to a DC breaking apparatus including semiconductor devices 3a, 3b of opposite conducting directions. Which semiconductor device that acts as the forward-conducting semiconductor device of such DC breaking apparatus depends on the direction of the DC current flowing through the conductor 1. The semiconductor device which is currently not the forward-conducting semiconductor device could, as mentioned above, be switched at the same frequency as the forward-conducting semiconductor device, in order to simplify the control of the switching. Reference numeral 3 will be used when generally referring to a semiconductor device, thus including semiconductor devices 3, 3a and 3b; reference numeral 14 will be used when generally referring to a current measurement device, thus including current measurement devices 14, 14a or 14b; etc.

Figure 3:
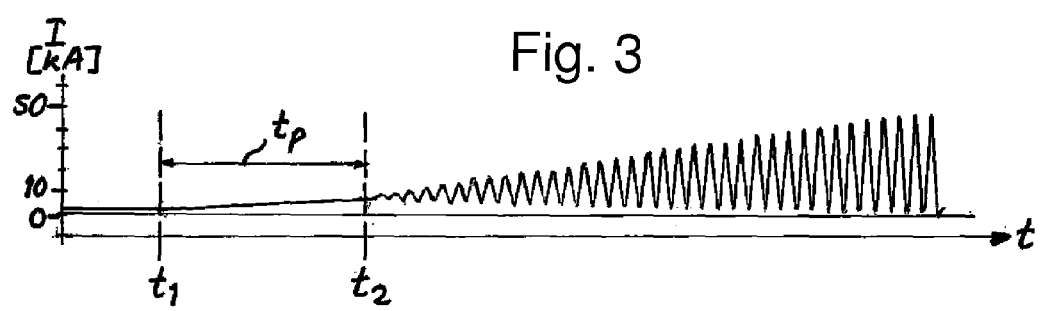
FIG. 3 is a graph of the fault current I through the mechanical interrupter of the apparatus according to FIG. 1 versus time t upon occurrence of a fault in the high voltage DC conductor shown in FIG. 1.
Figure 4:
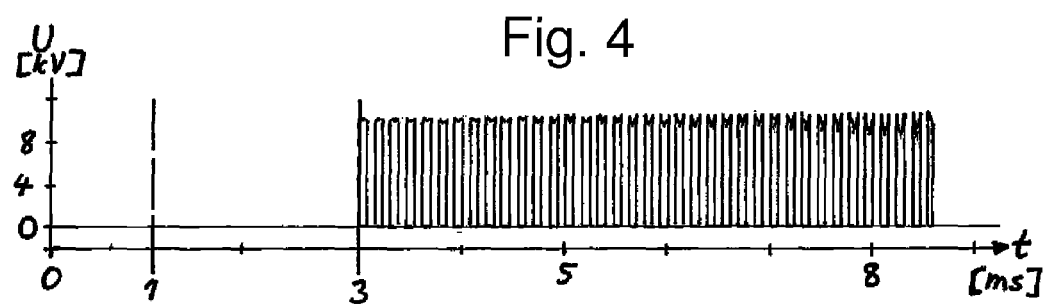
FIG. 4 is a graph of the voltage U across the semiconductor device of the apparatus shown in FIG. 1 versus time t upon occurrence of a said fault.

An example of the operation of the DC breaker apparatus 100 in the case of occurrence of a fault will now be explained while making reference also to FIGS. 3 and 4. FIG. 3 illustrates the fault current I through the mechanical interrupter 2 as a function of time t in a fault scenario, while FIG. 4 illustrates the voltage across the forward-conducting semiconductor device 3 as a function of time t in the same scenario.

During normal operation, the forward-conducting semiconductor device 3 and the mechanical interrupter 2 will be closed. A current, for example a current of magnitude in the order of 2000 A, will flow in the DC conductor 1 through the forward-conducting semiconductor device 3 and the mechanical interrupter 2. The energy transfer loss will be comparatively low in the semiconductor device 3, since the semiconductor device 3 has only to be rated for a value somewhat higher than the protective voltage level of the arrester 5. Hence, semiconductor device 3 could typically be implemented without having to use a large number of semiconductor elements.

When a fault 17 occurs on the DC line, which may be a line-to-line fault or a line-to-ground fault, this is detected by the fault-current detector 11 and information thereabout is sent to the control unit 12. This occurs at the time $t_1$ shown in FIGS. 3 and 4. After the fault has occurred, the fault current through the interrupter rises at a rate given by the ratio between the system voltage of the DC conductor and the reactance of the fault current derivative limiting reactor 16. The rise of the current takes place until the time $t_2$, at which time the control unit 12 controls the mechanical interrupter 2 to trip. Upon tripping of the mechanical interrupter 2, the mechanical contacts thereof start to separate, so that an arc is formed therebetween. Time $t_2$ can for example occur when a protection time $t_p$ has lapsed since the fault was detected, so that $t_2 = t_1 + t_p$. The duration of $T_p$ could for example be 2 ms. In another embodiment, $T_p$ is essentially zero, so that the tripping of the mechanical interrupter is performed as soon as a fault current which requires tripping has been detected. The control unit 12 further triggers the switching of the forward-conducting semiconductor device 3 at a frequency close to the eigenfrequency of the LC-circuit 6, so that the capacitance 8 will be charged by the fault current through the interrupter 2. The fault current will then oscillate with an increasing amplitude as shown in FIG. 3, this oscillation caused by the switching of the forward-conducting semiconductor device 3, and the voltage across the capacitance will increase by each firing pulse sent to the forward-conducting semiconductor device 3 until current zero 0 is reached by the fault current through the interrupter 2. In the scenario illustrated by FIGS. 3 and 4, the switching of the forward-conducting semiconductor device 3 is initiated at the same time as the tripping of the mechanical interrupter 2.

The switching of the forward-conducting semiconductor device 3 can advantageously be performed such that the zero-crossing is reached at a point in time when the current changes direction so that the current derivative is zero. A current derivative which is favourable for current-interruption is also obtained when the amplitude of the oscillating part of the current is close to, but slightly higher than, the DC fault current, that is, when the minor current loop of the total current is small (the minor current loop being the part of the total fault current which flows in the direction opposite to the DC part of the fault current). An example of a criterion that could be used for defining when the current derivative is favourable is that the minor current loop is smaller than approximately 5-10% of the total amplitude of the oscillating component of the current. Another way of expressing such a criterion is that the magnitude of the oscillating part of the current through the interrupter 2 should be larger than the magnitude of DC part of this current, but only by a small amount, such as by around 10-20%. By providing for current zero-crossing at a current magnitude (absolute value) maximum, proper interruption of the current through the interrupter is facilitated. Once the current through the mechanical interrupter 2 has been interrupted, the interrupter 2 will withstand the rising recovery voltage which will be limited by the further arrester 9 connected in parallel with the LC-circuit 6.

The presence of the measuring devices 14 and 15 for providing feedback, which presence, however, is not necessary, makes it possible to adapt the switching of the forward-conducting semi-conductor device 3 to reach zero-crossing of the fault current through the interrupter in the most favourable way (at a zero or low current derivative as described above) and at the instant desired. This happens in the embodiment shown in FIGS. 3 and 4 about 5.6 ms after tripping of the interrupter. In an embodiment where no such measuring device is present, a predetermined switching frequency may be employed. In FIGS. 1 and 2a-2c, the current measurement device 14 has been shown to be arranged to measure the current through the forward-conducting semiconductor device 3, thus providing a measure of the current through the interrupter. Alternatively, the current measurement device 14 could be arranged to obtain a measure of the current through the interrupter by measuring the common current of the forward-conducting semiconductor device 3 and the anti-parallel diode 4/anti-parallel semiconductor device 3. In another implementation, a current measurement device 14 could be arranged in the LC circuit 6, by means of which the oscillating component of the current through the mechanical interrupter 2 may be obtained. The DC component of the current through the mechanical interrupter 2 could then be obtained from the fault-current detector 11.

Although it is shown in FIGS. 3 and 4 that the switching of the forward-conducting semiconductor device 3 is started at the same time as the mechanical interrupter 2 is tripped, the tripping of the mechanical interrupter 2 may be delayed by a determined period of time with respect to the start of the switching of the forward-conducting semiconductor device 3. A determined period between the triggering of the switching of the forward-conducting semiconductor device 3 and the tripping of the mechanical interrupter 2 facilitates for refraining from opening the mechanical interrupter 2 should the control unit 12 receive information about a disappearance of the fault within the determined period. Oftentimes, the time it takes to open the mechanical interrupter 2 is the limiting factor when a fast breaking operation is desired, in which case the opening of the interrupter 2 could advantageously be initiated at the same time as the initiation of the switching. Separation of the contacts of the interrupter 2 does not have to be reached at the same time as the first zero-crossing of the current occurs, but could be reached either before or after the occurrence of the first zero-crossing, as long as the contacts will be separated at the occurrence of a zero-crossing of the current.

Parameters influencing the interrupter procedure include the protective voltage level of the arrester 5, a higher such level means that the capacitance will be charged more rapidly. Furthermore, higher values of the inductance and the capacitance of the LC circuit 6 will result in a lower eigenfrequency of the LC-circuit and a lower suitable frequency of the switching of the semiconductor device 3. The values of L and C should be chosen for obtaining an interruption situation to be managed by the mechanical interrupter 2, such as with respect to recovery voltage across the interrupter 2. It also has to be considered which frequency the semiconductor device 3 may operate at, and the semiconductor device 3 also has to be able to break the current therethrough when being turned off in said switching.

FIG. 5 is a flowchart illustrating an example of a method performed in control unit 12 for controlling the operation of the semiconductor switch(es) 3 and the mechanical interrupter 2 in case of a detected fault current, in an embodiment wherein the switching frequency can be adjusted in dependence on measurements of at least one parameter relating to the operation of the arrangement 10. At step 500, a fault indication is received by the control unit 12, typically from fault-current detector 11. Switching of the forward-conducting semiconductor 3 is then initiated in step 505, where the switching is performed at a predetermined frequency $f_0$ which is typically set at or in the vicinity of the eigenfrequency of the LC circuit 6, as described above. The opening of interrupter 2 is also initiated in step 505, at the same time as the initiating of the switching, or, if desired, at a different point in time. In step 510, control unit 12 receives measurements results, from the current measurement device 14, of the current $I_t$ through the interrupter 2. At step 515, it is checked whether the magnitude of the oscillating part, $I_{osc}$, of $I_t$ is smaller than the magnitude of the DC part, $I_{DC}$, of $I_t$. If so, this indicates that the magnitude of the oscillating part $I_{osc}$ will have to increase for any current zero-crossings to occur. Step 530 is then entered, wherein it is checked whether the switching frequency f is smaller than $f_0$. If so, step 535 is entered, wherein the switching frequency f is increased. Step 510 is then re-entered for continued monitoring of the current $I_t$ through the interrupter 2. If, it was found in step 520 that $f=f_0$, then step 510 is re-entered directly following step 520.

If, on the other hand, it is found in step 515 that the magnitude of $I_{DC}$ does not exceed the magnitude of $I_{osc}$, step 530 is entered. In step 530, the ratio of the magnitude of $I_{ocs}$ to the magnitude of $I_{DC}$ is compared to a predetermined ratio maximum M, which could for example be set in the range of 110-120%. If it is found that the ratio exceeds the ratio maximum M, then step 535 is entered, wherein f is reduced. The reduction can for example be determined in dependence on the ratio of $I_{osc}$ to $I_{DC}$. Step 510 is then re-entered. If it is found in step 530 that the ratio does not exceed M, then step 510 is entered directly.

By the method of FIG. 5 can be ensured that a current-zero crossing in the interrupter 2 will occur at a point where the current derivative is small in accordance with the above. The method shown in FIG. 5 is an example only, and alternative implementations could be contemplated. For example, measurements of the voltage across the capacitor 8 could be considered in determining if and how the switching frequency should be adapted, in addition to, or in lieu of, measurements of the current $I_t$; switching frequencies higher than the initial frequency $f_0$ could be allowed, etc.

Control unit 12 can be implemented as a suitable combination of hardware and software. For example, control unit 12 could include one or more processors and a memory which stores software for performing the method shown in FIG. 5, the processor being arranged to carry out the method of FIG. 5 when the software is executed on the processor. The software could e.g. be provided the form of a computer program product which is provided at least partially through a network, such as the Internet, or on a computer readable medium.

The invention is of course not in any way restricted to the embodiments described above, but many possibilities to modifications thereof will be apparent to a person with ordinary skill in the art without departing from the scope of the invention as defined in the appended claims.

It would be possible to cascade several interrupters so as to obtain higher voltages, i.e. to connect a plurality of modules comprising the elements 2-9 and 13-15 shown in FIG. 1 in series.

The invention claimed is:

1. A DC breaker apparatus capable of interrupting a fault current occurring in a high voltage DC conductor, said apparatus comprising
at least one mechanical interrupter configured to be connected in series with said DC conductor, and
an arrangement configured to obtain zero-crossing of the current through said interrupter upon occurrence of a fault current in said conductor,
a control unit configured to control said arrangement and mechanical interrupter,
wherein said arrangement comprises
at least one semiconductor device of turn-off type connected in series with said mechanical interrupter,
an arrester connected in parallel with said semiconductor device for defining a maximum voltage across said device, and
an LC-circuit in the form of a series connection of an inductance and a capacitance connected in parallel with the series connection of said at least one semiconductor device and the mechanical interrupter,
and wherein
said control unit is configured to, upon detection of a fault current:
control switching of at least one of said at least one semiconductor devices at a frequency adapted to the values of said inductance and capacitance, in order to charge said capacitance by the fault current while making the current through the mechanical interrupter oscillate with an increasing amplitude, and
control the tripping of the mechanical interrupter so that the mechanical contacts thereof will be separated when a current zero-crossing is reached, so that interruption of the fault current through the mechanical interrupter is obtained, the DC breaker apparatus further comprising
at least one measuring device configured to measure at least one parameter relating to the operation of said arrangement upon occurrence of a said fault and send the result of a measurement to said control unit, and wherein the control unit is configured to adapt said switching in response to such measurement result.

2. The apparatus of claim 1, wherein
said arrangement comprises a rectifying diode connected in anti-parallel with said semiconductor device.

3. The apparatus of claim 2, wherein
said arrangement comprises a series connection of two semiconductor devices of opposite conducting directions and a series connection of two rectifying diodes of opposite conducting directions, wherein the semiconductor devices and rectifying diodes are connected such that each semiconductor device is connected in anti-parallel with a rectifying diode.

4. An apparatus according to claim 3, wherein
the control unit is configured to carry out said switching of the semiconductor device at a frequency being 90%-110% of the eigenfrequency of said LC-circuit.

5. An apparatus according to claim 2, wherein
the control unit is configured to carry out said switching of the semiconductor device at a frequency being 90%-110% of the eigenfrequency of said LC-circuit.

6. The apparatus of claim 1, wherein
said arrangement comprises two semiconductor devices of opposite current direction connected in anti-parallel, said anti-parallel connection of semiconductor devices being connected in parallel with said arrester.

7. An apparatus according to claim 6, wherein
the control unit is configured to carry out said switching of the semiconductor device at a frequency being 90%-110% of the eigenfrequency of said LC-circuit.

8. An apparatus according to claim 1, wherein
the control unit is configured to carry out said switching of the semiconductor device at a frequency being 90%-110% of the eigenfrequency of said LC-circuit.

9. An apparatus according to claim 8, wherein
said measuring device is configured to measure the current through said semiconductor device.

10. An apparatus according to claim 9, wherein said measuring device is configured to measure the voltage across said capacitance.

11. An apparatus according to claim 1, wherein said control unit is configured to delay initiation of separation of the mechanical contacts of the interrupter by a determined period of time with respect to the start of the switching of said semiconductor device for possibly refraining from opening the interrupter should said control unit receive -information about a disappearance of said fault within this period of time.

12. An apparatus according to claim 1, further comprising a further arrester connected in parallel with said LC-circuit.

13. An apparatus according to claim 1, wherein
the control unit is configured to carry out said switching of the semiconductor device with a frequency of 100 Hz -10 kHz or 500 Hz -5 kHz.

14. An apparatus according to claim 1, wherein
said inductance has a value of 0.1 mH -10 mH.

15. An apparatus according to claim 1, wherein said capacitance has a value of 10 nF -100 μF or 0.5 -5 μF.

16. An apparatus according to claim 1, wherein
the protective level of said arrester connected in parallel with said semiconductor device is less than 50% or less than 10% of the voltage level intended for said high voltage DC conductor with respect to ground.

17. An apparatus according to claim 1, further comprising a fault-current detector configured to detect occurrence of a fault current in a conductor in which the apparatus is connected.

18. An AC/DC converter station comprising an apparatus according to claim 1, wherein the DC breaker apparatus is connected to said high voltage DC conductor of the AC/DC converter station.

19. A DC grid comprising an apparatus according to claim 1, wherein the apparatus is configured to protect equipment of the DC grid.

20. A method of controlling a DC breaker apparatus for interrupting a fault current occurring in a high voltage DC conductor, the DC breaker apparatus including a mechanical interrupter and an arrangement configured to obtain zero-crossing of the current through said interrupter upon occurrence of a fault current in said DC conductor, the arrangement including at least one semiconductor device of turn-off type and an LC circuit in the form of a series connection of an inductance and a capacitance, wherein the method comprises:
    initiating the switching of a said semiconductor device of turn-off type at a first frequency adapted to the values of said inductance and capacitance;
    initiating the opening of the mechanical interrupter;
    receiving measurements of at least one parameter relating to the magnitude of the current through the mechanical interrupter;
    checking whether the ratio of an oscillating part of said current to a DC part of said current is larger than one but smaller than a predetermined value; and if not,
    adjusting the frequency of the switching of the semiconductor device.

* * * * *